(12) United States Patent  
Groneberg-Nienstedt

(10) Patent No.: US 7,435,437 B2
(45) Date of Patent: Oct. 14, 2008

(54) PRODUCTION OF FOODSTUFFS WITH A FILLING

(75) Inventor: Petra Groneberg-Nienstedt, Düsseldorf (DE)

(73) Assignee: Nienstedt GmbH, Haltern (DE)

( * ) Notice: Subject to any disclaimer, the term of this patent is extended or adjusted under 35 U.S.C. 154(b) by 534 days.

(21) Appl. No.: 10/508,683

(22) PCT Filed: Jan. 23, 2003

(86) PCT No.: PCT/EP03/00640

§ 371 (c)(1), (2), (4) Date: Sep. 20, 2004

(87) PCT Pub. No.: WO03/077682

PCT Pub. Date: Sep. 25, 2003

(65) Prior Publication Data

US 2005/0153024 A1    Jul. 14, 2005

(30) Foreign Application Priority Data

Mar. 20, 2002 (DE) .............................. 102 12 456
Oct. 10, 2002 (DE) .............................. 102 47 283

(51) Int. Cl.
*A23P 1/10* (2006.01)

(52) U.S. Cl. .......................... 426/282; 426/89; 426/92; 426/512; 426/513; 426/641; 426/643; 426/644

(58) Field of Classification Search ....................... None
See application file for complete search history.

(56) References Cited

U.S. PATENT DOCUMENTS

| 3,728,136 A | | 4/1973 | Langlands | |
|---|---|---|---|---|
| 4,279,932 A | * | 7/1981 | Koshida et al. | 426/89 |
| 4,780,328 A | * | 10/1988 | Akesson et al. | 426/390 |
| 4,832,970 A | * | 5/1989 | Mally et al. | 426/274 |
| 5,246,721 A | * | 9/1993 | Kerkonian | 426/279 |
| 5,690,989 A | | 11/1997 | Clarke et al. | 426/641 |
| 6,203,838 B1 | | 3/2001 | Whitehouse | 426/512 |
| 6,521,280 B1 | | 2/2003 | Whitehouse, deceased et al. | 426/513 |

FOREIGN PATENT DOCUMENTS

| DE | 198 06 391 | 8/1999 |
|---|---|---|
| EP | 0935919 | 10/2002 |
| GB | 2280869 | 2/1995 |

* cited by examiner

*Primary Examiner*—Lien Tran
(74) *Attorney, Agent, or Firm*—Andrew Wilford

(57) ABSTRACT

A frozen foodstuff is made by first molding a foodstuff blank while frozen under pressure into a first foodstuff part that has a cavity intended to hold a filling. Then filling is loaded into the cavity of the first foodstuff part while frozen. Finally a second frozen foodstuff part is fitted to the first foodstuff part to close the cavity. The mating edges of the parts can be coated with water and/or egg white to stick together, and the two parts can then be breaded or otherwise coated.

9 Claims, 2 Drawing Sheets

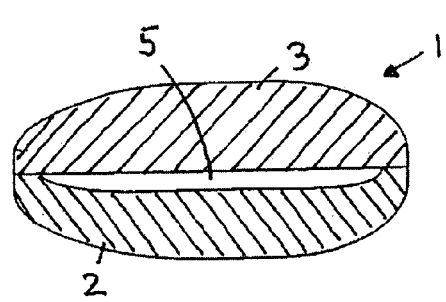 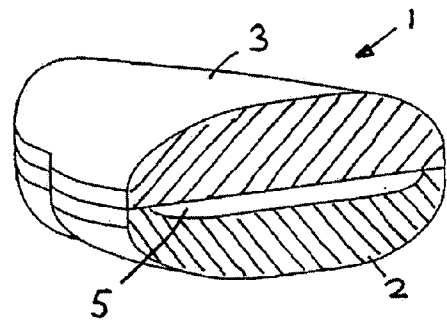
*Fig. 2a*  *Fig. 2b*

PRODUCTION OF FOODSTUFFS WITH A FILLING

CROSS REFERENCE TO RELATED APPLICATIONS

This application is the US national phase of PCT application PCT/EP2003/000640, filed 23 Jan. 2003, published 25 Sep. 2007 as WO 2003/077682, and claiming the priority of German patent application 10212456.6 itself filed 20 Mar. 2002 and German patent application 10247283.1 itself filed 10 Oct. 2002, whose entire disclosures are herewith incorporated by reference.

FIELD OF THE INVENTION

The invention relates to a method of making a frozen filled foodstuff.

BACKGROUND OF THE INVENTION

A foodstuff is known that is a pocket whose interior holds a filling, e.g. Cordon Bleu. In addition a foodstuff is known that completely contains a filling. Both types of foodstuff are expensive to produce and it is highly likely that the filling leaks out when the foodstuff is eventually heated.

OBJECT OF THE INVENTION

It is an object of the invention to provide a method of making a frozen filling-containing foodstuff that permits automatic mass-production and also ensures exact control over weight and shape. Another object of the invention is to provide a filled foodstuff whose filling can be counted on not to leak out.

SUMMARY OF THE INVENTION

These objects are attained according to the invention in that a foodstuff blank is molded while frozen under pressure into a first foodstuff part that has a cavity intended to hold a filling, then filling is loaded into the cavity of the first foodstuff part while frozen, and finally a second frozen foodstuff part is fitted to the first foodstuff part to close the cavity.

Alternately according to the invention the first foodstuff blank is not made with such a cavity, and the filling is loaded onto it while frozen. Then according to this alternate embodiment of the invention the second foodstuff part is fitted to the first foodstuff part over the filling.

With such a process it is possible to make the two foodstuff parts, in particular the two portion halves, with an exact shape and weight. The filling is loaded into one or both of the halves or foodstuff parts easily and surely and after closing of the two foodstuff parts a solid attachment of these two parts is created. In this manner an automatic process works with minimal waste and the tightest weight and volume tolerances.

A particularly solid attachment of the two foodstuff parts or halves is achieved when edges at which the two foodstuff parts engage each other are coated with a liquid that adheres the edges together. The liquid can be or contain water and/or egg white.

In a further possible embodiment it is suggested that the second foodstuff part also has a cavity that a cavity with the cavity of the first foodstuff part.

It is furthermore advantageous when after attaching the two foodstuff parts together an outer surface of the two foodstuff parts is provided with an outer layer, in particular breading. This outer layer can hold the two foodstuff parts or portions together.

BRIEF DESCRIPTION OF THE DRAWING

Embodiments of the invention are shown in the drawing and are more closely described in the following. Therein:

FIGS. 2a and 2b show two foodstuff parts of which only one has a cavity.

SPECIFIC DESCRIPTION

Figure 1A:
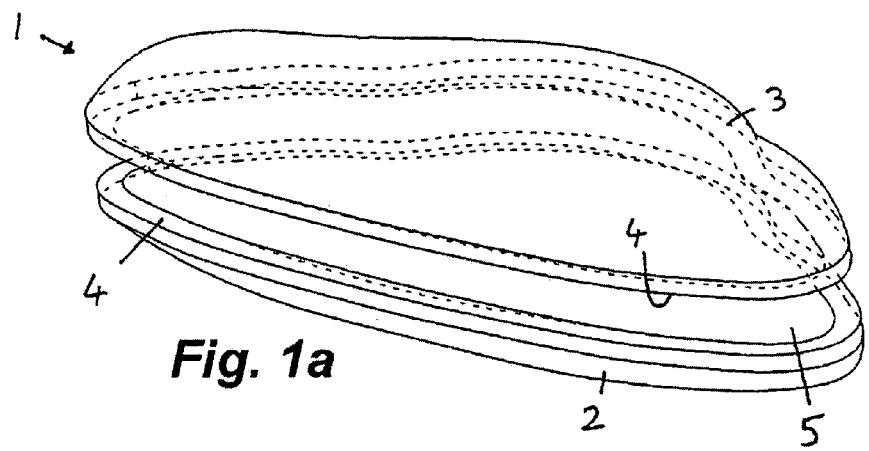
FIGS. 1a-1d show two foodstuff parts each having a cavity.
Figure 1B:
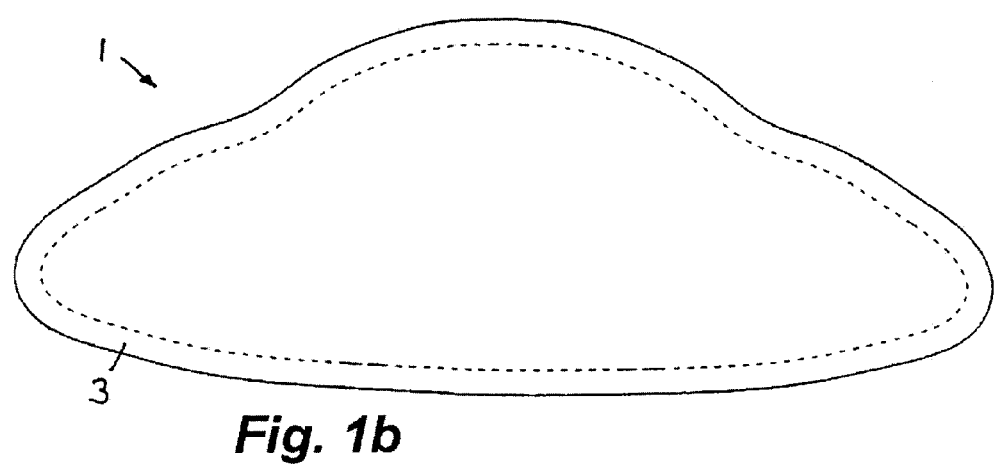
Figure 1C:
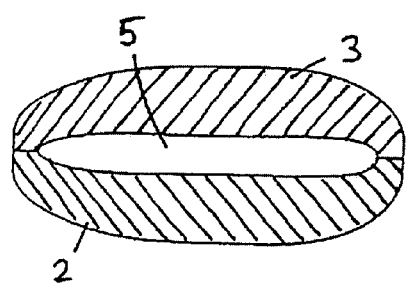
Figure 1D:
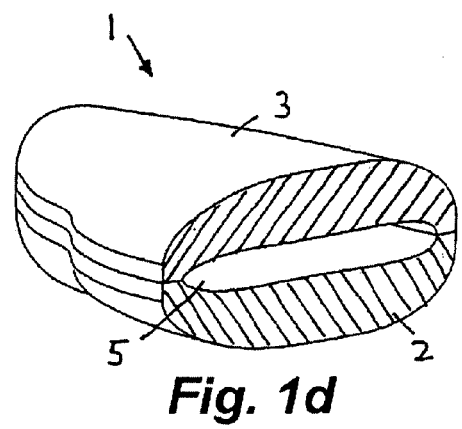

Deep-frozen foodstuff parts 2 and 3 (e.g. of fish or sawed-off pieces of a deep-frozen fish block) are shaped under pressure in appropriately formed dies or molds. The starting temperature of the foodstuff portions is preferably $-5°$ C. to $-20°$ C. The pressurized shaping process is described in German patent 198 06 391.

Coating of the molds is done manually or automatically. The completed deep-frozen portion, product, or foodstuff part is shaped such that two or more can be fitted together to form a pocket 1.

One part 2 is previously filled with another foodstuff or other foodstuffs, preferably herb butter, cheese, ham, sausage, special filling, or combinations thereof. Then the one part 2 in which the filling has been loaded and a second empty part 3 are fitted together. This process also works with more parts.

Before fitting together, an additive, preferably water, egg white, or a similar foodstuff acting as a binder, is applied to edges of the parts 2 and 3 in order to ensure that the assembly holds together during later handling (as e.g. powder-coating, breading, cooking). The shape of the cutout 5 or cavity depends on requirements. Preferably it is high enough that it minimizes separation of the outer layer during further treatment.

The two foodstuff parts 2 and 3 can have the same shape, each with a cavity 5. Alternatively the second part 3 can have no cavity or only a very shallow cavity in order for it to serve as base or cover for the first part 2.

In addition the first part can be flat or have only a slight, that is flat, cavity and serve as base so that, after setting the filling on it, it is covered by the second part that has a larger cavity.

The invention claimed is:

1. A method of making a frozen foodstuff that contains a filling, the method comprising the steps of sequentially:
   molding a foodstuff blank while frozen under pressure into a first foodstuff part that has a cavity intended to hold a filling;
   loading filling into the cavity of the first foodstuff part while frozen, and
   fitting a second frozen foodstuff part to the first foodstuff part to close the cavity.

2. A method of making a frozen foodstuff that contains a filling, the method comprising the steps of sequentially:
   molding a foodstuff blank while frozen under pressure into a first foodstuff part;
   loading filling onto the first foodstuff part while frozen, and
   fitting a second frozen foodstuff part having a cavity to the first foodstuff part over the filling.

3. The method according to claim 1, further comprising the step of:
   coating edges at which the two foodstuff parts engage each other with a liquid that adheres the edges together.

4. The method according to claim 3 wherein the liquid is or contains water and/or egg white.

5. The method according to claim 1 wherein the second part is also formed with cavity that forms a common cavity with the cavity of the first foodstuff part.

6. The method according to claim 1 wherein after attaching the two foodstuff parts together an outer surface of the two foodstuff parts is provided with an outer layer.

7. The method according to claim 1 wherein the foodstuff blank is fish, beef, pork, or fowl.

8. A method of making a frozen foodstuff that contains a filling, the method comprising the steps of:

shaping a foodstuff while frozen into a first foodstuff part formed with a cavity and into a second foodstuff part fittable with the first part to close the cavity;

loading filling onto one of the parts while it is frozen; and fitting the other of the parts while frozen to the one part while frozen to close the cavity with the filling between the frozen parts.

9. The method defined in claim 8 wherein the second part is also formed with a cavity and is generally symmetrically identical to the first part.

* * * * *